United States Patent Office 3,357,984
Patented Dec. 12, 1967

3,357,984
PREPARATION OF TETRACHLORO- AND PENTA-
CHLOROPYRIDINE-1-OXIDES
Eric Smith, Madison, Conn., assignor to Olin Mathieson
Chemical Corporation, New Haven, Conn., a corporation of Virginia
No Drawing. Filed July 20, 1965, Ser. No. 473,492
4 Claims. (Cl. 260—290)

This invention relates to highly chlorinated pyridine-1-oxides and more particularly it relates to tetrachloropyridine-1-oxides and pentachloropyridine-1-oxide.

Various halopyridine-1-oxides have previously been prepared and described in the literature. For example, E. Brown in J. Am. Chem. Soc., 79, 3565 (1957), has disclosed the preparation of 2-chloropyridine-1-oxide (isolated as the hydrochloride) by the treatment of 2-chloropyridine with glacial acetic acid and 40% peracetic acid. This compound has also been previously provided when other organic peracids such as perbenzoic and permaleic acids have been employed. Dihalopyridine-1-oxides, while more difficult to prepare than the monohalopyridine-1-oxides, have also been previously provided. Thus, Evans et al. in Rec. Trav. Chim., 78, 408 (1959), have provided 2,6-dibromopyridine-1-oxide by the oxidation of 2,6-dibromopyridine with a solution of 30% hydrogen peroxide in trifluoroacetic acid. It is known that the corresponding 2,6-dichloropyridine-1-oxide can also be prepared by the oxidation of 2,6-dichloropyridine using a similar procedure.

However attempts to prepare tetrachloro- and pentachloropyridine-1-oxides by oxidation of the corresponding chlorinated pyridines have heretofore been unsuccessful. None of the aforementioned procedures provides the desired oxidized products, and it is evident that the highly chlorinated pyridines are much more difficult to oxidize than the monohalo and dihalo substituted pyridines. It appears that the electron withdrawing effect of the many chlorine atom substituents reduces the basicity of the nitrogen atom to a point where these highly chlorinated pyridines are extremely resistant to oxidation.

Now it has been found that highly chlorinated pyridines can be converted to the corresponding N-oxides by reaction with peroxytrifluoroacetic acid which has been prepared under selected and critical conditions. As used in the specification and claims herein, highly chlorinated pyridines are those compounds having four or five chlorine atoms directly attached as substituents on the pyridine ring. If the aforementioned chlorinated pyridines are contacted with a solution of peroxytrifluoroacetic acid which is prepared by the known conventional procedure, i.e., reaction of trifluoroacetic acid with 30–50% aqueous hydrogen peroxide, none of the desired N-oxides are obtained. Similar results are obtained when 70% hydrogen peroxide solution is utilized in the preparation of the peracid. However, it has now been determined that if aqueous hydrogen peroxide containing at least 80% by weight of peroxide is reacted with trifluoroacetic acid to provide a solution of peroxytrifluoroacetic acid, this peracid solution does provide the desired N-oxides when brought into contact with the highly chlorinated pyridines. Thus a critical feature in the process of this invention is the use of at least 80% aqueous hydrogen peroxide in the preparation of the oxidizing agent, peroxytrifluoroacetic acid.

The process may be carried out, if desired, by providing the peracid solution and then adding a trifluoroacetic acid solution of the highly chlorinated pyridine to the peracid solution. However, the preferred process embodiment comprises adding the concentrated hydrogen peroxide solution to a trifluoroacetic solution of the highly chlorinated pyridine wherein the peracid is formed and oxidation proceeds readily. The process of this invention is conveniently performed at a reaction temperature range of about 15° to about 110° C., but a preferred temperature range of 35°–75° C. is generally employed.

The optimum yields of the highly chlorinated pyridine-1-oxides are obtained when the chlorinated pyridine reactants are contacted with an amount of peracid solution such that the concentration of the chlorinated pyridines is about 15–35% by weight of the total reaction mixture. Upon completion of the oxidation process, the desired N-oxides are readily isolated by pouring the reaction mixture into water wherein the essentially insoluble products may be isolated by filtration or similar procedures. The products can be purified by recrystallization from appropriate liquid media.

The highly chlorinated pyridine-1-oxides of this invention are crystalline, stable solids. This is in marked contrast to the instability exhibited by 2-chloropyridine-1-oxide which is stable only in solution and must be isolated in the form of a hydrochloride salt. The 2,6-dichloropyridine-1-oxide is also known to be a relatively unstable compound.

The highly chlorinated pyridine-1-oxides of this invention are useful agricultural chemicals which have demonstrated utility as herbicides and nematocides. They are particularly valuable soil fungicides since they have shown outstanding effectiveness in this area. For instance when fungicidal formulations containing 50 parts per million of 2,3,5,6-tetrachloropyridine-1-oxide as active ingredient are applied to the soil area surrounding cotton plants, the fungi *Rhizoctonia solani* and *Pythium ultimum,* which are pathogenic to cotton plants, are completely controlled. Similar application to the soil surrounding cucumber plants has resulted in complete control of *Fusarium oxysporum f. cucumerinum,* a fungus pathogenic to the cucumber plant. The high activity of the highly chlorinated pyridine-1-oxides as soil fungicides is an unexpected feature of this invention since it is known that dichloropyridine-1-oxides are essentially inactive as soil fungicides.

Although the compounds of this invention can be utilized in concentrated form as soil fungicides, it is more practical and desirable to utilize them in a dispersed form admixed with a major amount of a suitable carrier or extending agent. A variety of liquid and solid diluents or carriers may be employed in the preparation of useful formulations. However, they are preferably applied to the soil in the form of dusts and powders wherein they are admixed with inert solids such as kaolin, calcium carbonate, talc, Barden's clay, Attapulgus clay and the like. Generally the active ingredient is present in such formulations in amounts of about 25–100 parts per million, and is thoroughly mixed therein by suitable ball milling or grinding operations. Addition of a suitable wetting agent to such solid formulations provides mixtures especially suitable for mixing with water to obtain dispersions useful in spraying operations. The active ingredients here can also be applied by spraying techniques to soil areas when solutions in appropriate organic solvents are provided.

The following examples are illustrative of the preparation of the highly chlorinated pyridine-1-oxides in accordance with this invention.

EXAMPLE 1

Into a two liter, three necked flask equipped with stirrer, thermometer and dropping funnel was placed a solution of 460.0 g. (2.12 moles) of 2,3,5,6-tetrachloropyridine in 1.2 liters of trifluoroacetic acid. The solution was heated to 50° C., and 250 ml. of 90% hydrogen peroxide was added dropwise over a 2¼ hour period while the temperature was maintained at 50°–60° C. by the intermittent use of a cooling bath. The resulting solution was then refluxed for 15 minutes, cooled to room temperature and poured into two liters of water. The reaction mixture was then filtered to remove a solid crystalline material. This damp solid was slurried in 1.5 liters of boiling carbon tetrachloride wherein a small amount of water was separated from the crystals. The carbon tetrachloride solution was cooled to provide 163.0 g. of a white crystalline product melting at 204°–209° C. Concentration of the filtrate to one liter gave a further crop (19.5 grams) of solid material melting at 180°–196° C. The residual filtrate was evaporated yielding 242 grams of the beginning tetrachloropyridine.

The solid product was recrystallized from carbon tetrachloride to provide a white crystalline material melting at 212°–215° C. The following analytical data revealed that the desired 2,3,5,6-tetrachloropyridine-1-oxide had been obtained. Yield: 78% (corrected).

*Analysis.*—Calcd. for $C_5HCl_4NO$: C, 25.79; H, 0.43; N, 6.01; Cl, 60.88. Found: C, 25.30, 25.50; H, 0.64, 0.45; N, 6.16, 6.21; Cl, 60.8, 61.1.

Determination of the percentage of N-oxide, by the titanous chloride method, gave a figure corresponding to 97.4% of the theoretical value for 2,3,5,6-tetrachloropyridine-1-oxide.

EXAMPLE 2

Into a one liter, three necked flask, equipped as in Example 1, was placed 93.4 g. (0.37 mole) of pentachloropyridine and 360 ml. of trifluoroacetic acid. The solution was heated to 60° C., and 60 ml. of 90% hydrogen peroxide was added dropwise over a 1 hour period at a temperature range of 60°–100° C. The resulting solution was refluxed for 30 minutes and cooled to room temperature wherein a solid precipitated from solution. This solid was identified as pentachloropyridine. The filtrate was diluted with 1.3 liters of water wherein a white crystalline material precipitated; it was filtered and dried, providing 15 g. of crystals melting at 110°–135° C. This solid product was recrystallized from water and then from hexane to provide a crystalline material melting at 177°–181° C. The following analytical data revealed that the desired pentachloropyridine-1-oxide had been obtained.

*Analysis.*—Calcd. for $C_5Cl_5NO$: C, 22.47; H, 0.0; Cl, 66.33; N, 5.24. Found: C, 22.69; H, 0.0; Cl, 65.2; N, 5.47.

What is claimed is:
1. 2,3,5,6-Tetrachloropyridine-1-oxide.
2. Pentachloropyridine-1-oxide.
3. A process for preparing highly chlorinated pyridine-1-oxides which comprises providing a solution of peroxytrifluoroacetic acid by reacting trifluoroacetic acid with an aqueous solution of hydrogen peroxide, said aqueous solution containing at least 80% by weight of hydrogen peroxide, and contacting highly chlorinated pyridines with said solution of peroxytrifluoroacetic acid at a temperature range of about 15° C. to about 110° C.
4. A process for preparing a highly chlorinated pyridine-1-oxide which comprises:
  (a) providing a first solution of a highly chlorinated pyridine in trifluoroacetic acid,
  (b) contacting said first solution with an aqueous solution of hydrogen peroxide at a temperature range of about 15° C. to about 110° C., with said aqueous solution containing at least 80% by weight of hydrogen peroxide, and
  (c) isolating said -1-oxide product from the reaction mixture.

References Cited

Den Hertog et al., Rec. Trav. Chim., T. 76, pp. 261–6 (1957).
Evans et al., Rec. Trav. Chim., T. 78, pp. 408–11 (1959).
Den Hertog et al., Rec. Trav. Chim., vol. 69 (1950), pp. 673, 685 and 696.
Klingsberg, Pyridine and Deriv., part 2, Interscience (1961), pp. 102.
Chem. Abstracts, vol. 51, par. 15, 516 at g (1957).
Chem. Abstracts, Sixth Collective Subject Index [PL–So], pp. 9800, col. I (1957–1961).

NORMA S. MILESTONE, *Acting Primary Examiner.*

A. L. ROTMAN, *Assistant Examiner.*